(12) United States Patent
Koertge et al.

(10) Patent No.: US 7,839,011 B2
(45) Date of Patent: Nov. 23, 2010

(54) METHOD AND APPARATUS FOR SIGNAL TRANSMISSION WITH ISOLATION IN MEDICAL DEVICES

(75) Inventors: Detlef W. Koertge, Carpentersville, IL (US); Hongxuan Zhang, Schaumburg, IL (US); Bryon Pelzek, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 678 days.

(21) Appl. No.: 11/832,106

(22) Filed: Aug. 1, 2007

(65) Prior Publication Data

US 2008/0191850 A1 Aug. 14, 2008

Related U.S. Application Data

(60) Provisional application No. 60/888,972, filed on Feb. 9, 2007.

(51) Int. Cl.
*H02J 3/00* (2006.01)
(52) U.S. Cl. .................................... 307/3; 307/1; 307/4
(58) Field of Classification Search ............ 307/1, 307/3, 4
See application file for complete search history.

(56) References Cited

U.S. PATENT DOCUMENTS

| | | | |
|---|---|---|---|
| 5,886,576 A | 3/1999 | Carlson | |
| 5,966,297 A | 10/1999 | Minegishi | |
| 6,407,691 B1* | 6/2002 | Yu | 341/155 |
| 6,519,339 B1 | 2/2003 | Sacca et al. | |
| 6,885,184 B1* | 4/2005 | Gofman | 324/118 |
| 6,908,434 B1 | 6/2005 | Jenkins et al. | |
| 6,926,675 B2 | 8/2005 | Muuranto et al. | |
| 6,989,710 B2* | 1/2006 | Li et al. | 329/300 |
| 7,277,491 B2* | 10/2007 | Dong et al. | 375/258 |
| 2003/0215020 A1 | 11/2003 | Dong et al. | |
| 2005/0213874 A1 | 9/2005 | Kline | |
| 2007/0173802 A1* | 7/2007 | Keppel | 606/34 |

\* cited by examiner

*Primary Examiner*—Hal I Kaplan
(74) *Attorney, Agent, or Firm*—Alexander J Burke (57) ABSTRACT

An apparatus and method for signal transmission with isolation in medical devices. Data signals, such as patient measurement data and medical instrumentation control signals are converted to dynamic signals which are transmitted on power lines through an isolation module, such as a transformer. The dynamic signals are then converted to data signals having a voltage based on the frequency of the dynamic signals.

24 Claims, 6 Drawing Sheets

METHOD AND APPARATUS FOR SIGNAL TRANSMISSION WITH ISOLATION IN MEDICAL DEVICES

This application claims the benefit of U.S. Provisional Application No. 60/888,972, filed Feb. 9, 2007, the disclosure of which is herein incorporated by reference.

FIELD

The present invention relates to signal transmission in medical devices, and more particularly to transmitting isolated signals in medical devices.

BACKGROUND

High voltage isolation in medical devices is important for patient and user safety. In particular, in medical devices which utilize high voltages, such as a defibrillator, ablation catheter, etc., isolation is needed between any portion of the device that comes into contact with a patient and any high voltage, such as a power source or computer system. In order for a medical device to be properly isolated, there can be no direct electrical connection between the portion of the device that comes into contact with a patient and the high voltage. A portion of a medical device that is required to be isolated from a mains voltage is referred to herein as an "isolated portion" and a portion of a medical device including a mains voltage is referred to herein as a "non-isolated portion". Regulations, such as IEC-60601, specify standards of isolation necessary in medical devices.

Conventionally, medical devices separately isolate power transmission and data transmission. For example, for power transmission between the non-isolated and isolated portions of a medical device, a transformer is typically used, and for data/signal transmission between the non-isolated and isolated portions, a separate electrical circuit, such as an optical diode, fiber, etc., is typically used. However, there are several shortcomings with the conventional isolation and signal transmission strategies. For example, different isolation and signal transmission strategies in a medical device can lead to complex hardware with many components and different levels of isolation distributed to different parts of the device. Accordingly, with a greater number of components, there may be a greater risk for current leakage for each component and between components, which causes safety risks. Also, the need for different types of system components for different isolation and signal transmission strategies may lead to a low function to cost ratio, increasing the cost of medical devices. In addition, the need for a greater number of electrical circuits and components can lead to increased noise and electrical artifacts in the signal transmission. Furthermore, conventional methods typically transmit isolated digital signals which have been converted using analog to digital conversion, leading to an increased risk for high voltage shock to hardware components of a medical device. This can shorten the life span of components of the medical device.

SUMMARY

An embodiment of the present invention is directed to a method and system for transmitting isolated signals in medical devices. Embodiments of the present invention avoid the necessity of having separate circuits for isolating power and signal transmission by combining analog or digital signals, such as patient measurement data or medical instrumentation control signals, onto power lines and transmitting them through an isolation module between an isolated portion and a non-isolated portion.

In one embodiment of the present invention, an isolation module transmits power between a non-isolated portion and an isolated portion of a medical device, and also transmits a dynamic signal between the non-isolated portion and the isolated portion. At least one frequency to voltage converter receives the dynamic signal transmitted by the isolation device and converts a portion of the dynamic signal to a data signal having a voltage based on a frequency of the portion of the dynamic signal.

According to an embodiment of the present invention, multiple voltage to frequency converters in the isolated portion each convert a received data signal to a dynamic signal having a frequency based on the voltage of the data signal and within a unique frequency band. These dynamic signals can be transmitted as a combined dynamic signal through the isolation module to the non-isolated portion. In the non-isolated portion, multiple frequency to voltage converters each convert a portion of the combined dynamic signal within one of the unique frequency bands to a data signal having a voltage based on the frequency of the portion of the combined dynamic signal within the unique frequency band.

According to another embodiment of the present invention, a multi-channel controllable power source in the non-isolated portion can be used to generate a dynamic signal including multiple dynamic control signals each within a unique frequency band. The dynamic signal is transmitted through the isolation module to the isolated portion. In the isolated portion, multiple frequency to voltage converters each convert a portion of the dynamic signal within one of the unique frequency bands to a command signal having a voltage based on the frequency of the portion of the dynamic signal within the unique frequency band.

These and other advantages will be apparent to those of ordinary skill in the art by reference to the following detailed description and the accompanying drawings.

DETAILED DESCRIPTION

An embodiment of the present invention is directed to a method and apparatus for transmitting isolated signals in a medical device. Embodiments of the present invention transmit data signals between non-isolated and isolated portions of a medical device via the same isolation module that is used for power transmission between the non-isolated portion and the isolated portion. According to advantageous embodiments of the present invention, multi-channel transmission of power, signals, and data can be achieved with one isolation module, rather than different isolation modules for different types of signals. As described herein, embodiments of the present invention use an isolation transformer as the isolation module. However, the embodiment is not limited to a transformer as the isolation module, and may employ other isolation approaches, such as using an optical/magnetic field transmitter and receiver, wide bandwidth electrical signal to mechanical signal oscillator, wireless transmission (e.g., blue tooth, WiFi, Zigbee, infrared), etc.

Figure 1:
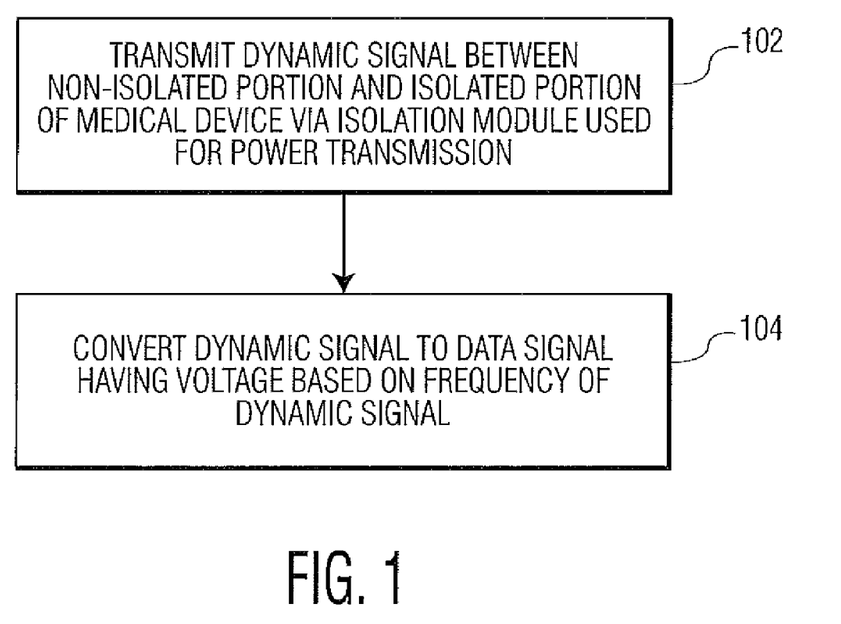
FIG. 1 illustrates a method of signal transmission with isolation according to an embodiment of the present invention.
Figure 2:
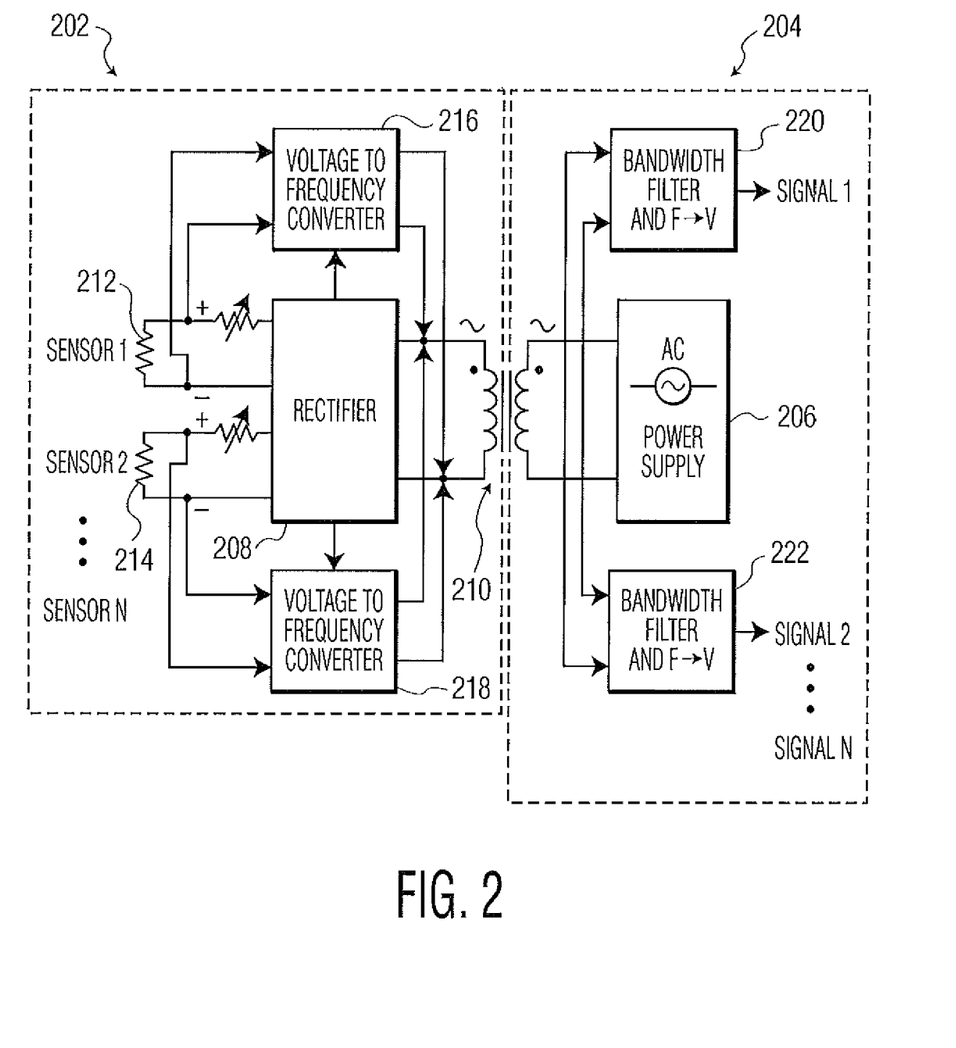
FIG. 2 illustrates an integrated isolation apparatus according to an embodiment of the present invention.
Figure 5:
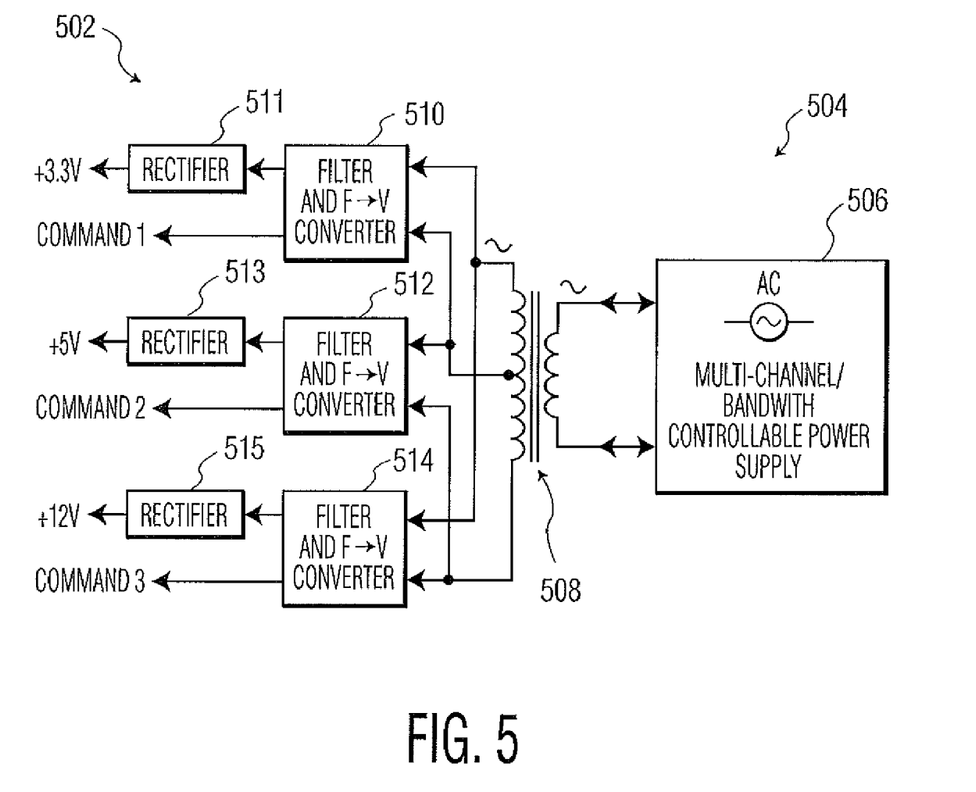
FIG. 5 illustrates an integrated isolation apparatus according to another embodiment of the present invention.

FIG. 1 illustrates a method of signal transmission with isolation according to an embodiment of the present invention. As illustrated in FIG. 1, at step 102, a dynamic signal is transmitted between non-isolated and isolated portions of a medical device via an isolation module that is used for power transmission between the non-isolated portion and the isolated portion. The dynamic signal may be a multi-channel signal, which combines multiple dynamic signals each having a unique frequency band. At step 104, the dynamic signal is converted to a data signal having a voltage based on a frequency of the dynamic signal. It is possible that multiple portions of the dynamic signal each within a particular frequency band will be filtered out of the dynamic signal, and each portion of the dynamic signal will be converted to a separate data signal having a voltage based on the frequency of the portion of the dynamic signal within the particular frequency band. Accordingly, multiple data signals can be transmitted in the multi-channel dynamic signal, with each data signal being transmitted within a corresponding frequency band. The method shown in FIG. 1 can be implemented in a variety of ways. FIGS. 2 and 5 illustrate various advantageous embodiments in which to implement the method of FIG. 1, and will be described in greater detail below.

FIG. 2 illustrates an integrated isolation system for transmitting isolated signals in a medical device according to an embodiment of the present invention. As illustrated in FIG. 2, this system provides a signal pathway from patient to user. Signals, for example electrocardiogram (ECG) signals, from a patient, are sensed by hardware sensors 212 and 214 and converted to dynamic signals. The dynamic signals are then transferred by a high voltage isolation transformer 210.

As illustrated in FIG. 2, the apparatus includes an isolated portion 202 and a non-isolated portion 204. The non-isolated portion 204 includes a power supply 206. Power supply 206 is an AC power supply that provides power to all of the components of the apparatus in the non-isolated portion 204 as well as the isolated portion 202. AC power from power supply 206 is transmitted over an isolation transformer 210 and received by a rectifier 208 in the isolated portion 202. The rectifier 208 rectifies and filters the AC power received via the transformer 210 in order to convert the AC power to a regulated DC power supply which is used to power sensors 212 and 214 and voltage to frequency converters 216 and 218 in the isolated portion 202.

Sensor 1 (212) and Sensor 2 (214) measure some type of data from a patient. For example, sensors 1 and 2 (212) and (214) can measure data such as blood pressure, heart activity, etc. Sensors 1 and 2 (212) and (214) sense patient measurement data and output a data signal representing the patient measurement data. The data signal can be an analog signal (such as a bipolar signal, unipolar signal, reference GND, etc.) having a voltage representing the measured data. Sensor 1 (212) outputs a first signal to a first voltage to frequency converter 216 and sensor 2 (214) outputs a second signal to a second voltage to frequency converter 218. As illustrated in FIG. 2, the present invention can have N number of sensors, each of which transmit a signal to a corresponding voltage to frequency converter.

The first voltage to frequency converter 216 converts the first data signal received from sensor 1 (212) into a first dynamic signal. A dynamic signal is a signal that oscillates at a certain frequency. The frequency of the first dynamic signal is based on the voltage of the first data signal such that the frequency of the first dynamic signal varies with the voltage of the first data signal. The first voltage to frequency converter 216 has a unique frequency band ($f_{1min}$ to $f_{1max}$) associated therewith and the frequency of the first dynamic signal is always within the frequency band ($f_{1min}$ to $f_{1max}$) associated with the first voltage to frequency converter 216. Similarly, the second voltage to frequency converter 218 converts the second data signal received from sensor 2 (214) into a second dynamic signal having a frequency based on the voltage of the second data signal and within a unique frequency band ($f_{2min}$ to $f_{2max}$) associated with the second voltage to frequency converter 218. The first and second dynamic signals are combined into a combined dynamic signal which is transmitted over the isolating transformer 210 to the non-isolated portion 204. Since the first and second dynamic signals are in different frequency bands, the signals can be combined linearly to the transformer 210 input without any interference.

In the non-isolated portion 204, the combined dynamic signal is received at a first bandwidth filter and frequency to voltage converter 220 and a second bandwidth filter and frequency to voltage converter 222. The first bandwidth filter and frequency to voltage converter 220 filters a portion of the combined dynamic signal including the first frequency band ($f_{1min}$ to $f_{1max}$) associated with the first voltage to frequency converter 216, and converts the filtered portion of the combined dynamic signal to a data signal having a voltage based on the frequency of the filtered portion of the combined dynamic signal. Similarly, the second bandwidth filter and frequency to voltage converter 222 filters a portion of the combined dynamic signal including the second frequency band ($f_{2min}$ to $f_{2max}$) associated with the second voltage to frequency converter 218, and converts the filtered portion of the combined dynamic signal to a data signal having a voltage based on the frequency of the filtered portion of the combined dynamic signal. Although the bandwidth filters and frequency to voltage converters are shown as common devices in FIG. 2, it is to be understood that they can be implemented separately as well.

The isolation transformer 210 can be implemented using a wide bandwidth transformer, whose bandwidth can be shared by multi-channel signals, data commands, power supply, etc. However, the present invention is not limited to an isolation transformer, and other isolation modules can be used in place of the isolation transformer according to various embodiments of the present invention.

Figure 3:
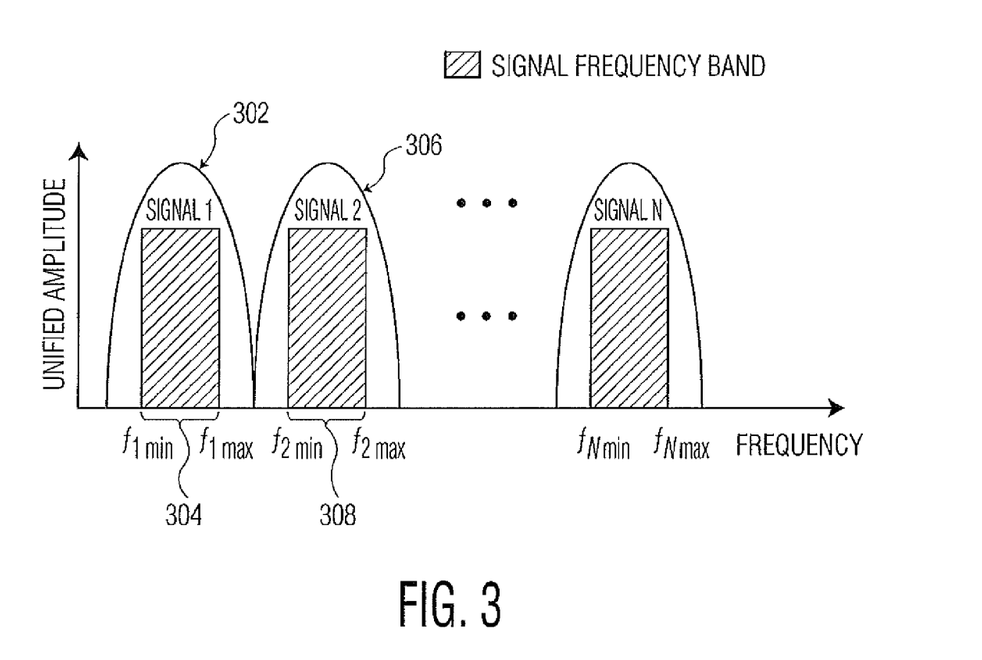
FIG. 3 illustrates filtering unique frequency bands corresponding to different voltage to frequency converters according to an embodiment of the present invention.

FIG. 3 illustrates filtering unique frequency bands corresponding to different voltage to frequency converters. FIG. 3 shows the frequency bandwidth and range distribution of multi-channel signals from different sensors. The signals are coded and decoded in/from different frequency bands without any interference and signal overlapping. For example, channel 1 has the frequency band 304, from $f_{1min}$ to $f_{1max}$, channel 2 has the frequency band 308, from $f_{2min}$ to $f_{2max}$, and there is no overlapping between frequency band 304 and frequency band 308. Hence, the filters can extract different channel signals without any distortion and additional noise.

As illustrated in FIG. 3, the first bandwidth filter and frequency to voltage converter 220 employs a filter 302 that filters the first frequency band 304 ($f_{1min}$ to $f_{1max}$) from the combined dynamic signal. Since the frequency of the first dynamic signal generated by the first voltage to frequency converter 216 is within the first frequency band 304 ($f_{1min}$ to $f_{1max}$), the first dynamic signal is filtered from the combined dynamic signal and converted to a data signal having a voltage based on the frequency of the first dynamic signal. Thus, the first bandwidth filter and frequency to voltage converter 220 retrieves the first data signal output from sensor 1 (212). As illustrated in FIG. 3, the second bandwidth filter and frequency to voltage converter 222 employs a filter 306 that filters the second frequency band 308 ($f_{2min}$ to $f_{2max}$) from the combined dynamic signal. Since the frequency of the second dynamic signal generated by the second voltage to frequency converter 218 is within the second frequency band 308 ($f_{2min}$ to $f_{2max}$), the second dynamic signal is filtered from the combined dynamic signal and converted to a data signal having a voltage based on the frequency of the second dynamic signal. Thus, the second bandwidth filter and frequency to voltage converter 222 retrieves the second data signal output from sensor 2 214. This concept can be applied with n filters each filtering a unique frequency band associated with a separate voltage to frequency converter, so the dynamic signal generated by each voltage to frequency controller can be filtered from a combined dynamic signal and converted to a data signal. Since the frequency of each dynamic signal is used to convert it to a data signal, the amplitude of the signal does not affect the data signal, and each dynamic signal can have a unified amplitude.

Figure 4:
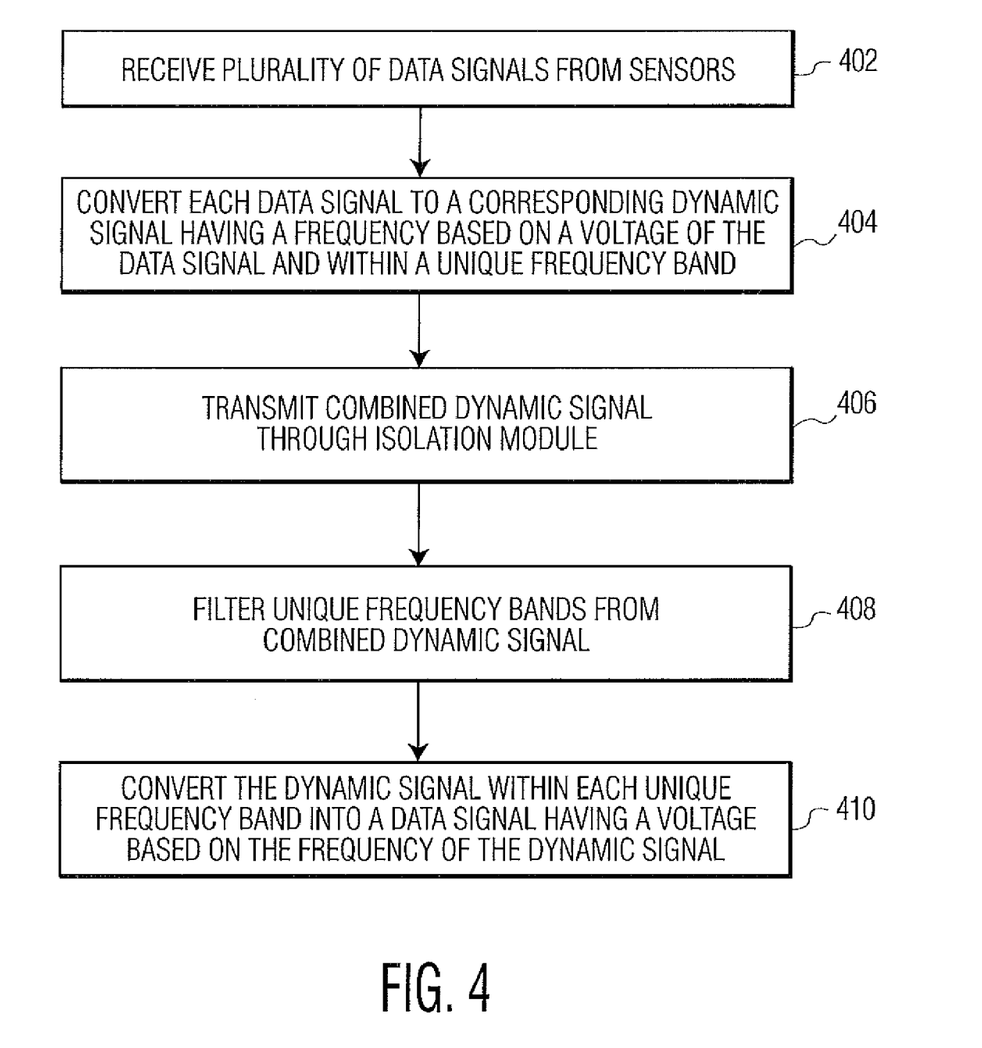
FIG. 4 illustrates a method of operation of the apparatus of FIG. 2 according to an embodiment of the present invention.

FIG. 4 illustrates a method of operation of the apparatus of FIG. 2 according to an embodiment of the present invention. At step 402, a plurality of data signals are received from the sensors 212 and 214 at the voltage to frequency converters 216 and 218. At step 404, each data signal is converted by a separate voltage to frequency converter 216 and 218 into a corresponding dynamic signal having a frequency based on the voltage of the data signal and within a unique frequency band associated with the voltage to frequency converter. At step 406, a combined dynamic signal including each of the dynamic signals generated by the voltage to frequency converters 216 and 218 is transmitted through an isolation module (transformer 210) to the non-isolated portion 204 of the apparatus. At step 408, the unique frequency bands associated with the voltage to frequency converters 216 and 218 are filtered from the combined dynamic signal by the bandwidth filter and frequency to voltage converters 220 and 222. At step 410, the dynamic signal within each of the unique frequency bands is converted into a data signal having a voltage based on the frequency of the dynamic signal within the unique frequency band by the bandwidth filter and frequency to voltage converters 220 and 222.

FIG. 5 illustrates an integrated isolation apparatus according to another embodiment of the present invention. As illustrated in FIG. 5, the apparatus includes an isolated portion 502 and a non-isolated portion 504. The non-isolated portion includes a multi-channel/bandwidth controllable power supply 506. The multi-channel/bandwidth controllable power supply 506 can transmit a signal having multiple channels for various power levels, as well as dedicated frequency bands for transmitting dynamic control signals. Accordingly, all of the various power levels and control signals can be transmitted as a combined dynamic signal having multiple channels. The combined dynamic signal is transmitted over an isolation transformer 508 to the isolated portion 502 of the apparatus. The isolation transformer 508 can be a multi-tap transformer capable of transmitting all of the channels of the combined dynamic signal simultaneously. The isolated portion 502 includes first, second, and third filter and frequency to voltage converters 510, 512, and 514. The first filter and frequency to voltage converter 512 filters a portion of the combined dynamic signal within a first frequency band associated with the first filter and frequency to voltage converter 514 and converts the portion of the combined dynamic signal within the first frequency band to a first control signal having a voltage based on the frequency of the portion of the combined dynamic signal within the first frequency band. The first control signal can be transmitted to a medical device connected to the first filter and frequency to voltage converter 510. The first filter and frequency to voltage converter 510 also filters a portion of the combined dynamic signal corresponding to a voltage level required to power the medical device connected to the first filter and frequency to voltage converter 510. This portion of the combined dynamic signal is converted by rectifier 511 to +3.3V DC power to power the attached medical device. The second filter and frequency to voltage converter 512 and the third filter and frequency to voltage converter 514, as well as rectifiers 513 and 515, operate similarly to generate second and third control signals and +5V and +12V DC power, respectively. Thus, multiple control signals and power levels can be transmitted to various medical devices simultaneously.

Figure 6:
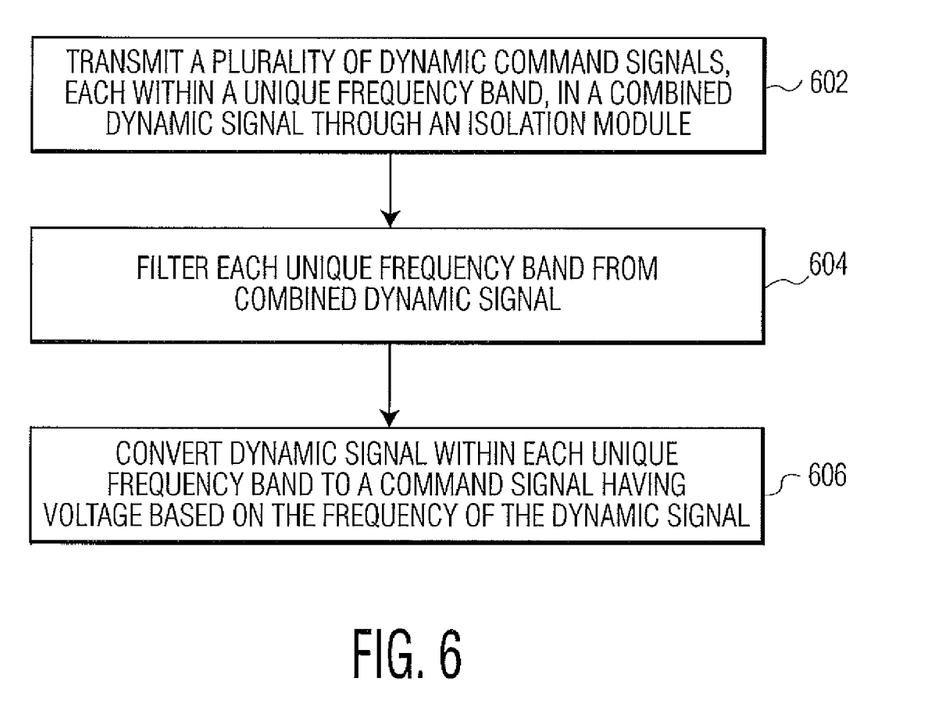
FIG. 6 illustrates a method of operation of the apparatus of FIG. 5 according to an embodiment of the present invention.

FIG. 6 illustrates a method of operation of the apparatus of FIG. 5 according to an embodiment of the present invention. At step 602, the multi-channel/bandwidth controllable power supply 506 transmits a plurality of dynamic control signals, each within a unique frequency band, in a combined dynamic signal through the isolation module (transformer 508). At step 604, each of the unique frequency bands are filtered from the combined dynamic signal by the filter and frequency to voltage converters 510, 512, and 514. At step 606, the dynamic signal within each unique frequency band is converted to a control signal having a voltage based on the frequency of the dynamic signal in the unique frequency band by the filter and frequency to voltage converters 510, 512, and 514.

As described above, in the embodiments of the present invention, signal conversion and transmission is based on signal frequency coding and decoding. Since the conversion to voltage is based on the frequency of a dynamic signal, this conversion is not affected by noise and signal distortion that may occur in the amplitude or phase of the signal.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An apparatus for transmitting signals between a non-isolated portion and an isolated portion of a medical device, comprising:

an isolation module configured to transmit power between the non-isolated portion and the isolated portion and configured to transmit a dynamic signal between the non-isolated portion and the isolated portion;

at least one frequency to voltage converter configured to receive said dynamic signal transmitted by the isolation module and configured to convert a portion of said dynamic signal to a data signal, said data signal having a voltage based on a frequency of said portion of said dynamic signal and said portion of said dynamic signal is within a particular frequency band; and at least one filter configured to filter said particular frequency band from said dynamic signal.

2. The apparatus of claim 1, wherein said data signal comprises one of patient measurement data and a medical instrumentation control signal.

3. The apparatus of claim 1, wherein said isolation module is a transformer.

4. The apparatus of claim 1, wherein said at least one frequency to voltage converter is in said non-isolated portion, said apparatus further comprising:

a voltage to frequency converter in said isolated portion configured to convert a received data signal to a dynamic signal having a frequency based on a voltage of the received data signal, wherein said isolation module is configured to transmit the dynamic data signal from said voltage to frequency converter in said isolated portion to said frequency to voltage converter in said non-isolated portion.

5. The apparatus of claim 1, further comprising:

a multi-channel controllable power source in said non-isolated portion configured to generate said dynamic signal, said dynamic signal including a plurality of dynamic control signals each within a unique frequency band;

wherein said at least one frequency to voltage converter comprises:

a plurality of frequency to voltage converters in said isolated portion, each configured to convert a portion of said dynamic signal within one of the unique frequency bands to a command signal having a voltage based on a frequency of the portion of said dynamic signal within the unique frequency band.

6. The apparatus of claim 5, wherein each of said plurality of frequency to voltage converters comprises:

a filter configured to receive said dynamic signal from the isolation module and configured to filter out a portion of the combined dynamic signal within one of the unique frequency bands.

7. The apparatus of claim 5, wherein said dynamic signal further includes a plurality of AC power levels.

8. An apparatus for transmitting signals between a non-isolated portion and an isolated portion of a medical device, comprising:

an isolation module configured to transmit power between the non-isolated portion and the isolated portion and configured to transmit a dynamic signal between the non-isolated portion and the isolated portion;

a plurality of voltage to frequency converters in said isolated portion, each configured to convert a received data signal to a dynamic signal having a frequency based on a voltage of said received data signal and within a unique frequency band; and wherein said isolation module is configured to transmit a combined dynamic signal including each dynamic signal to said non-isolated portion, and said at least one frequency to voltage converter comprises:

a plurality of frequency to voltage converters in said non-isolated portion, each configured to convert a portion of said combined dynamic signal within one of the unique frequency bands into a data signal based on the frequency of the portion of the combined dynamic signal within the unique frequency band.

9. The apparatus of claim 8, wherein each of said plurality of frequency to voltage converters comprises:

a filter configured to receive the combined dynamic signal from the isolation module and configured to filter out a portion of the combined dynamic signal within one of the unique frequency bands.

10. The apparatus of claim 8, further comprising:

a plurality of sensors, each configured to sense patient measurement data and configured to transmit a data signal to one of the plurality of voltage to frequency converters.

11. The apparatus of claim 8, further comprising:

an AC power source in said non-isolated portion configured to transmit AC power over said isolation module; and a rectifier in said isolated portion configured to convert said AC power to DC power and configured to supply said DC power to said plurality of voltage to frequency converters.

12. A method for transmitting signals between a non-isolated portion and an isolated portion of a medical device, comprising the activities of:

transmitting a dynamic signal between the non-isolated portion and the isolated portion of the medical device via an isolation module used to transmit power between the non-isolated portion and the isolated portion;

converting at least a portion of said dynamic signal to a data signal having a voltage based on a frequency of said at least a portion of said dynamic signal and said portion of said dynamic signal is within a particular frequency band; and filtering said particular frequency band from said dynamic signal.

13. The method of claim 12, wherein said data signal comprises one of patient measurement data and a medical instrumentation control signal.

14. The method of claim 12, wherein said isolation module is a transformer.

15. The method of claim 12, further comprising:

receiving a plurality of data signals at said isolated portion; and converting each of said plurality of data signals to a corresponding dynamic signal having a frequency based on a voltage of the corresponding data signal, said frequency within a unique frequency band;

wherein said step of transmitting a dynamic signal between the non-isolated portion and the isolated portion of the medical device via an isolation module comprises:

transmitting a combined dynamic signal including each of the corresponding dynamic signals via said isolation unit; and wherein said step of converting at least a portion of said dynamic signal to a data signal comprises:

converting a portion of said combined dynamic signal within each of the unique frequency bands into a data signal based on the frequency of the portion of the combined dynamic signal within the unique frequency band.

16. The method of claim 15, wherein said step of converting a portion of said combined dynamic signal within each of the unique frequency bands into a data signal comprises:

filtering out a portion of the combined dynamic signal within each of the unique frequency bands.

17. The method of claim 12, further comprising:

generating said dynamic signal at said non-isolated portion, said dynamic signal including a plurality of dynamic control signals each within a unique frequency band;

wherein said step of converting at least a portion of said dynamic signal to a data signal comprises:
converting a portion of said dynamic signal within each of the unique frequency bands to a command signal having a voltage based on a frequency of the portion of said dynamic signal within the unique frequency band.

18. The method of claim 17, wherein said step of converting a portion of said dynamic signal within each of the unique frequency bands to a command signal comprises:
filtering out a portion of said dynamic signal within each of the unique frequency bands.

19. The method of claim 17, wherein said dynamic signal further includes a plurality of AC power levels.

20. An apparatus for transmitting signals between a non-isolated portion and an isolated portion of a medical device, comprising:
means for transmitting a dynamic signal between the non-isolated portion and the isolated portion of the medical device and transmitting power between the non-isolated portion and the isolated portion;
means for converting at least a portion of said dynamic signal to a data signal having a voltage based on a frequency of said at least a portion of said dynamic signal, wherein said at least a portion of said dynamic signal is within a particular frequency band; and
means for filtering said particular frequency band from said dynamic signal.

21. The apparatus of claim 20, further comprising:
means for receiving a plurality of data signals at said isolated portion; and
means for converting each of said plurality of data signals to a corresponding dynamic signal having a frequency based on a voltage of the corresponding data signal, said frequency within a unique frequency band;
wherein said means for transmitting a dynamic signal between the non-isolated portion and the isolated portion of the medical device comprises:
means for transmitting a combined dynamic signal including each of the corresponding dynamic signals via said isolation unit; and
wherein said means for converting at least a portion of said dynamic signal to a data signal comprises:
means for converting a portion of said combined dynamic signal within each of the unique frequency bands into a data signal based on the frequency of the portion of the combined dynamic signal within the unique frequency band.

22. The apparatus of claim 21, wherein said means for converting a portion of said combined dynamic signal within each of the unique frequency bands into a data signal comprises:
means for filtering out a portion of the combined dynamic signal within each of the unique frequency bands.

23. The apparatus of claim 20, further comprising:
means for generating said dynamic signal at said non-isolated portion, said dynamic signal including a plurality of dynamic control signals each within a unique frequency band;
wherein said means for converting at least a portion of said dynamic signal to a data signal comprises:
means for converting a portion of said dynamic signal within each of the unique frequency bands to a command signal having a voltage based on a frequency of the portion of said dynamic signal within the unique frequency band.

24. The method of claim 23, wherein said means for converting a portion of said dynamic signal within each of the unique frequency bands to a command signal comprises:
means for filtering out a portion of said dynamic signal within each of the unique frequency bands.

* * * * *